Sept. 8, 1925.

O. HOPPE 1,552,607

DRIVING ARRANGEMENT FOR THE WORKING TABLES OF MACHINE TOOLS

Filed Jan. 26, 1923 2 Sheets-Sheet 1

Inventor:
Oscar Hoppe.
By B. Singer,
Atty

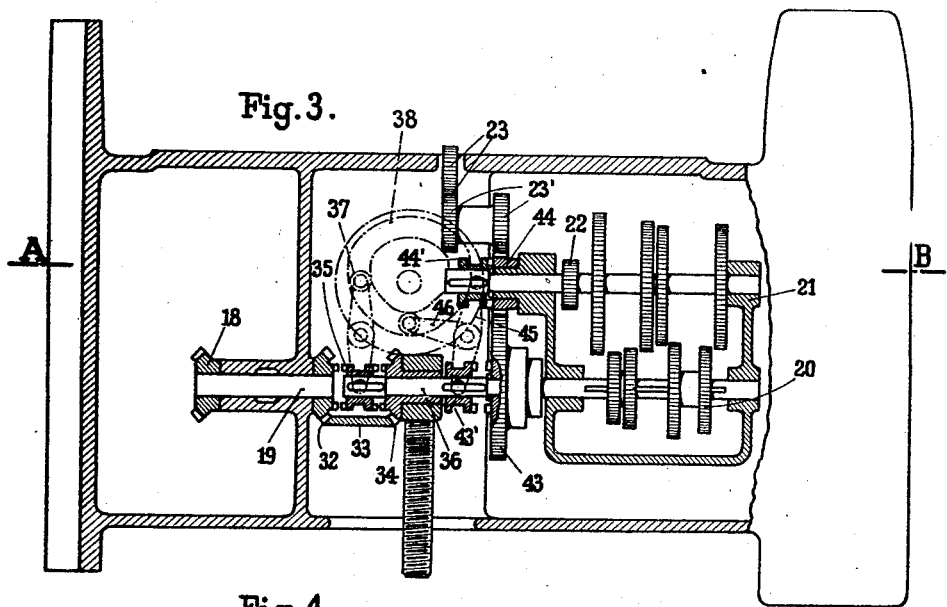
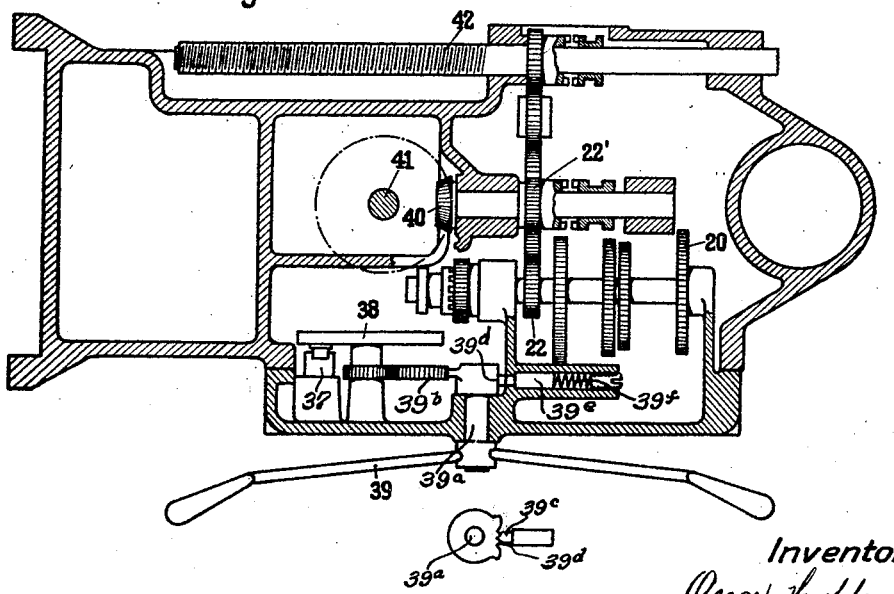

Patented Sept. 8, 1925.

1,552,607

UNITED STATES PATENT OFFICE.

OSCAR HOPPE, OF RORSCHACH, SWITZERLAND.

DRIVING ARRANGEMENT FOR THE WORKING TABLES OF MACHINE TOOLS.

Application filed January 26, 1923. Serial No. 615,096.

*To all whom it may concern:*

Be it known that I, OSCAR HOPPE, a citizen of the Republic of Switzerland, and residing at Rorschach, Switzerland, have invented certain new and useful Improvements in Driving Arrangements for the Working Tables of Machine Tools, of which the following is a specification.

This invention relates to the driving arrangements for the working tables of machine tools, particularly milling machines, for effecting the vertical movement as well as the longitudinal and the cross feed movements of the machine table. Its main object is to avoid the hitherto usual manner of driving by means of several external driving shafts and to use only the lowest possible number of driving elements with which to act on the table feed screws and to arrange said elements so as to produce the least possible amount of torque on the driving shafts.

Another object of the invention is to protect the said driving means against the entrance of dust and grit and against injury by arranging them within the standard of the machine, the lower bed plate and the cross slide, so that no rotating parts project to the outside.

A further object is the provision of means whereby the longitudinal and the cross feeds of the table as well as the vertical movement and the quick return motion are effected from the driving shaft, as is also the reversing motion, by means of a single lever which causes upon rotation from a single initial position (zero position) the occurrence of the various movements of the table successively.

Further objects of the invention are an increased efficiency of the machine and a smooth and reliable working of same.

With these and other objects in view the invention consists mainly in the provision, within the standard of the machine, of a toothed shaft to serve as the main driving shaft and which is capable, independent of the height of the working table, to constantly mesh with the driving pinion for the table gear which is journalled in the said table. A similar toothed shaft is arranged horizontally concealed within the cross slide and is in constant engagement with its driving pinion in the lower bed plate independent of the position of the cross slide. In this way the working table of the machine may be moved in all directions from the toothed driving shaft in the standard, whilst at the same time it is possible to impart two different speeds to the table in the longitudinal direction, namely the ordinary feed and a quick return motion, from the same vertical toothed shaft by the interposition of a reverse gear.

The accompanying drawings illustrate my invention by way of example.

Fig. 3 is a vertical section through the lower table of a modified form of the invention;

Fig. 4 is a horizontal section on line A—B of Fig. 3.

Figure 1:
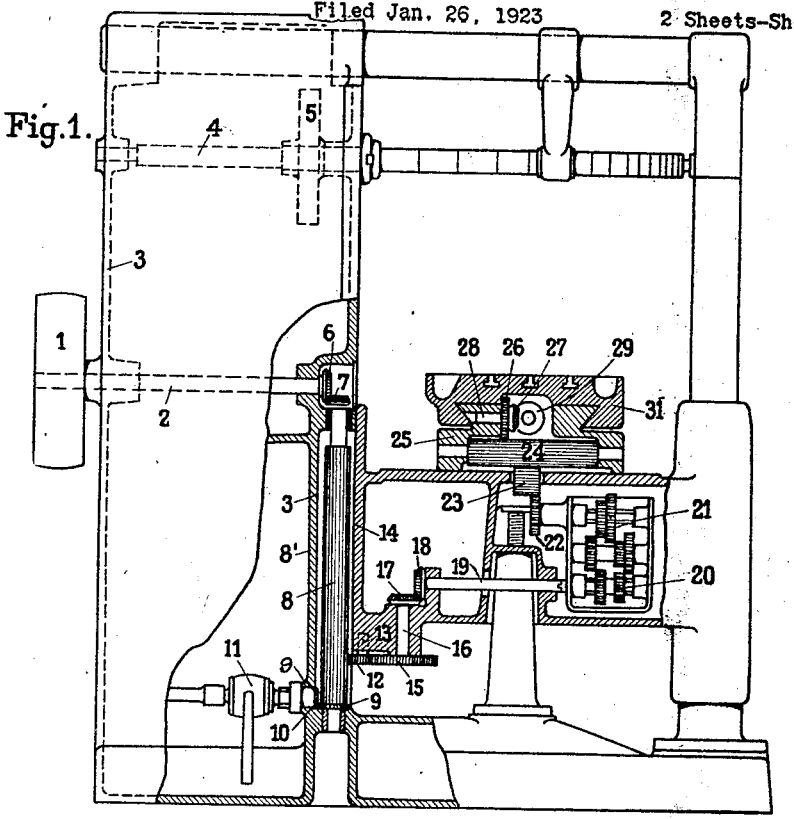
Fig. 1 is a part sectional side elevation of a milling machine provided with the new driving arrangement according to my invention.
Figure 2:
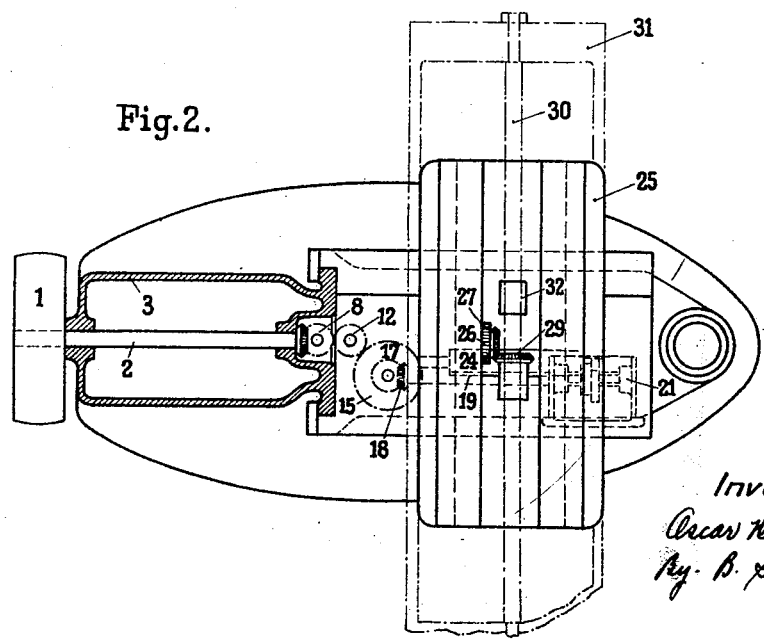
Fig. 2 is a plan view of Fig. 1 partly in section.

According to Figs. 1 and 2 of the drawings the machine is driven by means of the belt pulley 1 which rotates the horizontal driving shaft 2 journalled in the frame 3 of the machine. The rotations are transmitted from the said shaft 2 to the milling spindle 4 over its driving member 5, and the drive may be effected either by a belt, when the member 5 would be in the shape of a pulley, or by means of a countershaft gear by the employment of the requisite number of intermediate gear wheels. In the latter case the member 5 would have to be a gear wheel, but neither arrangement is shown in the drawings as forming any part of the invention. A bevel wheel 6 is arranged at the end of shaft 2 and is in mesh with a corresponding bevel wheel 7 on the upper end of a toothed shaft 8 within the column 8' of the machine standard.

At the foot of shaft 8 may be provided a bevel wheel 9 which, by means of a pinion 10, drives the horizontal shaft of a pump 11 or other machine as may be desired.

The toothed shaft 8 forms the central drive for the required movements of the table, namely for the vertical movement along the inner and outer guides, the transverse movement for the cross slide upon the lower bed plate, and for the longitudinal movement of the table. For this purpose there is arranged at the under side of the lower bed plate 14 a toothed wheel 12 to freely rotate on a pin 13, and it will be seen, that this pinion is able to mesh with the said toothed shaft independent of its position, that is to say, independent of the vertical movement of the lower bed plate 14, and to continuously remain in mesh therewith.

Transmission of the movement from the said wheel 12 is effected by means of gear 15 and shaft 16 onto a bevel wheel drive 17, 18 which, in turn, rotates the transverse shaft 19 forming the driving member of the change speed gears 20, 21, 22 arranged in concealed position within the lower bed plate 14. The pinion 22 of the said gear train causes the rotation of a cog wheel 23 which is arranged to project through an opening in the top plate of the lower bed plate and which is in constant engagement with the toothed shaft 24 horizontally disposed in the cross slide 25. In this connection it is to be noted, that the width of the cross slide is such that, on the said slide moving from one of its end positions into the other, the opening through which the wheel 23 projects is never uncovered but, on the contrary, is always covered up so as to prevent the entrance of chips and grit into the gearing within the lower bed plate. The said toothed shaft serves to effect the longitudinal movement of the working table 31 on the cross slide 25 by means of the intermediate gear mechanism 26 to 29; 26 being the main gear wheel which is rotated by the toothed shaft 24. Pinion 22, in addition, serves to effect the vertical movement of the lower bed plate by means of a bevel gear which is not represented in Fig. 2, but which will be referred to in greater detail in connection with the gearing example illustrated in Fig. 4. The same applies to the transverse movement of the cross slide 25 by means of a spur wheel countershaft, which is not shown in Fig. 2 but will also be fully described in connection with Fig. 4.

The drive of the gears 20 (feed gearing) and which is not more fully described in the present specification, is a feed gearing the specific construction of which is not the subject matter of the present invention. Instead of this feed gearing as shown, any one of the known feed gear transmissions for milling cutters may be used. The driving shaft of this feed gearing is the shaft 19. From this shaft the rotation is transmitted primarily to the lower shaft of the feed gearing shown in Figure 1 in elevation, in Figure 3 in a vertical section through a modified embodiment. By means of gears on this lower shaft rotation is then transmitted to a countershaft also provided with gears, and from this countershaft the rotation is transmitted by gears to the gear wheel 23, which serves for driving the geared roller 24. This transmission for rotating by means of shaft 19 the gear 23 through feed gears 20 to 22, is shown in Figure 1 as well as in Figure 3 and it is thought is sufficiently described for the purposes of this specification. However, a reverse gear is necessary in order to enable the transmission of the rotary movement from the central driving shaft in either direction. The said reverse gear may, for example, consist of the bevel wheels 32, 33, 34, of which either wheel 32 or wheel 34 may be connected to the shaft 36 by means of a clutch 35 so as to effect a rotation in the one or the other sense. The said clutch is operated by a slipper lever 37 and cam 38, the latter being set by a hand lever, hand wheel or the like 39 (Fig. 4) in a manner to be more fully explained at a later stage of this specification. The driving power from shaft 36 is transmitted onto the shaft of the intermediate gear 20, that is to say, shaft 36 serves at the same time as the shaft of the feed gear 20, of which the wheel 22 is used to drive the bevel gear 40 of the vertical screw 41 of the table by means of the followers 22', and also the transverse screw 42 of the cross slide 25.

Whereas, according to the arrangement shown in Fig. 1, the rotations of wheel 22 are directly transmitted to the gear 23, 24 for effecting the longitudinal displacement of the table at only the normal velocity of feed, the arrangement shown in Fig. 3 is such that the longitudinal movement at the normal velocity of feed may also be used for the quick return motion. For this purpose a spur wheel 43 is arranged to freely rotate on shaft 36 of the countershaft 19 and to engage with a pinion 44 freely rotating on the shaft of the gear wheel 22 so as to transmit its rotations to the driving pinion 23 by means, if necessary, by an intermediate gear 23'. By coupling the pinion 44 to the shaft of wheel 22, while the spur wheel 43 remains freely rotatable on the shaft of the gear wheel 20, the drive of the pinion 23 for the normal velocity of feed will take place from the countershaft 19. Coupling, however, wheel 43 to shaft 36 and uncoupling wheel 44 from the shaft of wheel 22, the drive will be effected from shaft 36 over spur wheel 43 and pinion 44 directly onto the table feed pinion 23 and, owing to the transmission ratio between 43 and 44, at a velocity which is a multiple of that transmitted by the change speed gears for the purpose of accelerating the movement of the table when travelling unloaded. The actuation of the clutches 43' and 44' for the wheels 43 and 44 is effected by means of a two-arm lever 45 controlled by the aforementioned cam 38, with which it is in engagement by means of a lever 46 bearing a cam roller at its end. Hereby the actuation of the clutches 35, 43' and 44' takes place in succession inasmuch, as first of all and according to the sense of rotation of the cam imparted to it by a hand lever 39 either to the left or to the right, clutch 35 is thrown into engagement with the bevel wheels 32 and 34 respectively, and that, on continued rotation of the cam, clutch 43' is engaged and clutch 44' simultaneously disengaged, and vice versa. Said lever 39 has a shaft 39$^a$ mounted in a bearing and provided with a gear segment 39$^b$ which engages a gear 39$^c$ on the shaft 38$^a$ of the cam 38. Shaft 39$^a$ also has a locked detent hub 39$^d$ which coacts with a detent 39$^e$ projected by a spring 39$^f$ to lock said lever and hence also said cam, against casual movement. The arrangement, as a rule, will be such, that both quick motion gear and the feed gear will have the same sense of rotation, that is to say, presuming the turning direction of the control lever to remain the same, the feed movement of the table towards the left will be followed by a quick return motion also towards the left. However, by the interarrangement of another wheel the quick motion gear may be caused to move in the opposite direction with regard to the feed gear, so that the feed will be in the left and the quick return motion in the right hand direction, in spite of the turning direction of the control lever remaining the same.

What I claim is:—

1. A driving arrangement for the working tables of machine tools comprising in combination with the machine standard a toothed shaft concealed within the machine standard, a pinion carried by the lower bed plate in constant engagement with the said toothed shaft irrespective of its position in height, another toothed shaft concealed within the cross slide, a pinion on the cross slide in constant mesh with the second named toothed shaft and actuating a toothed gear for the longitudinal movement of the machine table, and a train of intermediate gear wheels within the hollow lower bed plate between the two toothed shafts.

2. A driving arrangement for the working tables of machine tools comprising in combination with the machine standard a toothed shaft vertically disposed within the said standard, a pinion carried by the lower bed plate in constant engagement with the said toothed shaft, another toothed shaft horizontally disposed within the cross slide, a pinion on the cross slide in constant mesh with the said horizontal toothed shaft and actuating a toothed gear for the horizontal longitudinal movement of the table, and a train of intermediate gear wheels between the two toothed shafts.

3. A driving arrangement for the working tables of machine tools, comprising in combination with the machine standard, a vertically disposed toothed shaft within one of the columns of said standard, a lower bed plate vertically movable on the said standard, a pinion carried by the said lower bed plate in constant engagement with the said toothed shaft irrespective of its position in height, another pinion in the top of the said lower bed plate projecting through an opening therein, a cross slide moving on the lower bed plate, a horizontally disposed toothed shaft within the said cross slide and in constant engagement with the pinion in the top of the lower bed plate, and a toothed gear to effect the longitudinal displacement of the working table from the said horizontal toothed shaft.

4. A driving arrangement for the working tables of machine tools comprising in combination with the machine standard, a vertically disposed toothed shaft within the machine standard, a horizontally disposed toothed shaft within the cross slide arranged to move upon the lower bed plate of the machine, gear wheels intermediate the two toothed shafts and concealed within the lower bed plate, an opening in the top of the lower bed plate, a pinion projecting through the said opening to mesh with the horizontally disposed toothed shaft, said opening arranged so as to be covered by the cross slide at all positions of the latter.

5. A driving arrangement for the working tables of machine tools comprising in combination with the machine standard, a vertically disposed toothed shaft within the machine standard, a horizontally disposed toothed shaft within the cross slide arranged to move upon the lower bed plate of the machine, a feed velocity changing gear carried within the lower bed plate, a driving pinion comprised in the said gear, means driven by the said pinion for the vertical displacement of the lower bed plate, means also driven by the said pinion for the transverse displacement of the cross slide, and further means including a toothed shaft driven by the said pinion for the longitudinal displacement of the working table.

6. A driving arrangement for the working tables of machine tools comprising in combination with the machine standard, a vertically disposed toothed shaft within the standard, a lower bed plate adapted for vertical movement on the said standard, a main shaft carried by the said lower bed plate and driven from the said toothed shaft to operate the feed gear for the normal velocity of the table, a speed gear, coupling means between the normal velocity and quick motion gears to selectively operate either the one or the other, and means including a horizontally disposed toothed shaft to permit of the lateral and vertical movements of the table being effected from the said vertically disposed toothed shaft.

7. A driving arrangement for the working tables of machine tools comprising in combination with the machine standard, a vertically disposed toothed shaft within the machine standard, a lower bed plate adapted for vertical movement on the said standard, a main shaft carried by the said lower bed plate and driven from the said toothed shaft to operate the feed gear for the normal velocity of the table, a reverse gear intermediate the said toothed shaft and the normal velocity feed gear, a reversing clutch thereto, a speed gear, coupling means between the normal velocity and speed gears to selectively operate either the one or the other, and means including a horizontally disposed toothed shaft to permit of the lateral and vertical movements of the table being effected from the said vertical toothed shaft.

8. A driving arrangement for the working tables of machine tools comprising in combination with the machine standard, a vertically disposed toothed shaft within the standard, a lower bed plate adapted for vertical movement on the standard, a main shaft carried by the said lower bed plate and driven from the said toothed shaft to operate the feed gear for the normal velocity of the table, a reverse gear intermediate the said toothed shaft and the normal velocity feed gear comprising a reversing clutch and a clutch operating lever, a speed gear, a clutch between the normal velocity and speed gears to selectively operate either the one or the other, a cam to operate both the said clutches, a hand operated lever adapted to control the said clutches from a fixed zero position, and means including a horizontally disposed toothed shaft to permit of the lateral and vertical movements of the table being effected from the said vertically disposed toothed shaft.

In witness whereof I affix my signature.

OSCAR HOPPE.